United States Patent [19]
Paxson

[11] Patent Number: 6,097,938
[45] Date of Patent: *Aug. 1, 2000

[54] AUTHENTICATION AND TRACKING SYSTEM FOR A CELLULAR TELEPHONE

[75] Inventor: Dana W. Paxson, Rochester, N.Y.

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,510

[22] Filed: Jul. 11, 1997

[51] Int. Cl.⁷ .............................. H04M 1/66; H04M 7/20
[52] U.S. Cl. ........................ 455/410; 455/411; 455/456
[58] Field of Search .................... 455/410, 456, 455/403, 411, 560; 340/825.3, 825.34, 825.49

[56] References Cited

U.S. PATENT DOCUMENTS

| | | | |
|---|---|---|---|
| 4,872,204 | 10/1989 | Hammer et al. | 455/515 |
| 5,235,633 | 8/1993 | Dennison et al. | 455/456 |
| 5,295,180 | 3/1994 | Vendetti et al. | 455/456 |
| 5,334,974 | 8/1994 | Simms et al. | 340/990 |
| 5,335,265 | 8/1994 | Cooper et al. | 455/410 |
| 5,335,278 | 8/1994 | Matchett et al. | 380/23 |
| 5,345,595 | 9/1994 | Johnson et al. | 455/410 |
| 5,365,450 | 11/1994 | Schuchman et al. | 701/213 |
| 5,432,841 | 7/1995 | Rimer | 455/457 |
| 5,535,431 | 7/1996 | Grube et al. | 455/411 |
| 5,539,922 | 7/1996 | Wang | 455/456 |
| 5,559,520 | 9/1996 | Barzegar et al. | 342/357 |
| 5,561,704 | 10/1996 | Salimando | 455/456 |
| 5,566,225 | 10/1996 | Haas | 455/423 |
| 5,572,204 | 11/1996 | Timm et al. | 340/988 |
| 5,638,423 | 6/1997 | Grube et al. | 455/411 |
| 5,734,977 | 3/1998 | Sanmugam | 455/410 |
| 5,777,558 | 7/1998 | Pennypacker et al. | 455/410 |
| 5,790,645 | 8/1998 | Fawcett et al. | 455/410 |
| 5,835,857 | 11/1998 | Otten | 455/410 |
| 5,960,338 | 9/1999 | Foti | 455/411 X |
| 5,970,405 | 10/1999 | Kaplan et al. | 455/410 |
| 6,038,440 | 3/2000 | Wu | 455/410 |

FOREIGN PATENT DOCUMENTS

| | | |
|---|---|---|
| 0 679 041 | 10/1995 | European Pat. Off. . |
| 2239758 | 7/1991 | United Kingdom . |
| 2271486 | 4/1994 | United Kingdom . |
| WO 93/13618A1 | 7/1993 | WIPO . |
| WO 94/07337 A1 | 3/1994 | WIPO . |
| WO 96/41488 | 12/1996 | WIPO . |
| WO 97/09837 A2 | 3/1997 | WIPO . |
| WO 97/50274 A1 | 12/1997 | WIPO . |

*Primary Examiner*—Dwayne D. Bost
*Assistant Examiner*—Tracy M. Legree
*Attorney, Agent, or Firm*—Haynes and Boone, LLP

[57] ABSTRACT

A system and method that uses an advanced positioning system in combination with a cellular communication network to improve the performance of the network is disclosed. The system is capable of receiving an identification number for a mobile unit as well as a location code. In order to determine if the mobile unit is a fraudulent user of the cellular communication network, the system compares the location code with a previously received location code. Since there are natural physical constraints on how quickly a mobile unit can move from one location to another, the system can thereby determine if there are two mobile units using the same identification number. If so, then one is likely a fraudulent user. In addition, the system is capable of assisting the mobile unit by providing the location code to a third party. This is especially beneficial for emergency dispatcher services since, due to the very nature of mobile units, the user of the mobile unit may not know his precise location.

7 Claims, 2 Drawing Sheets

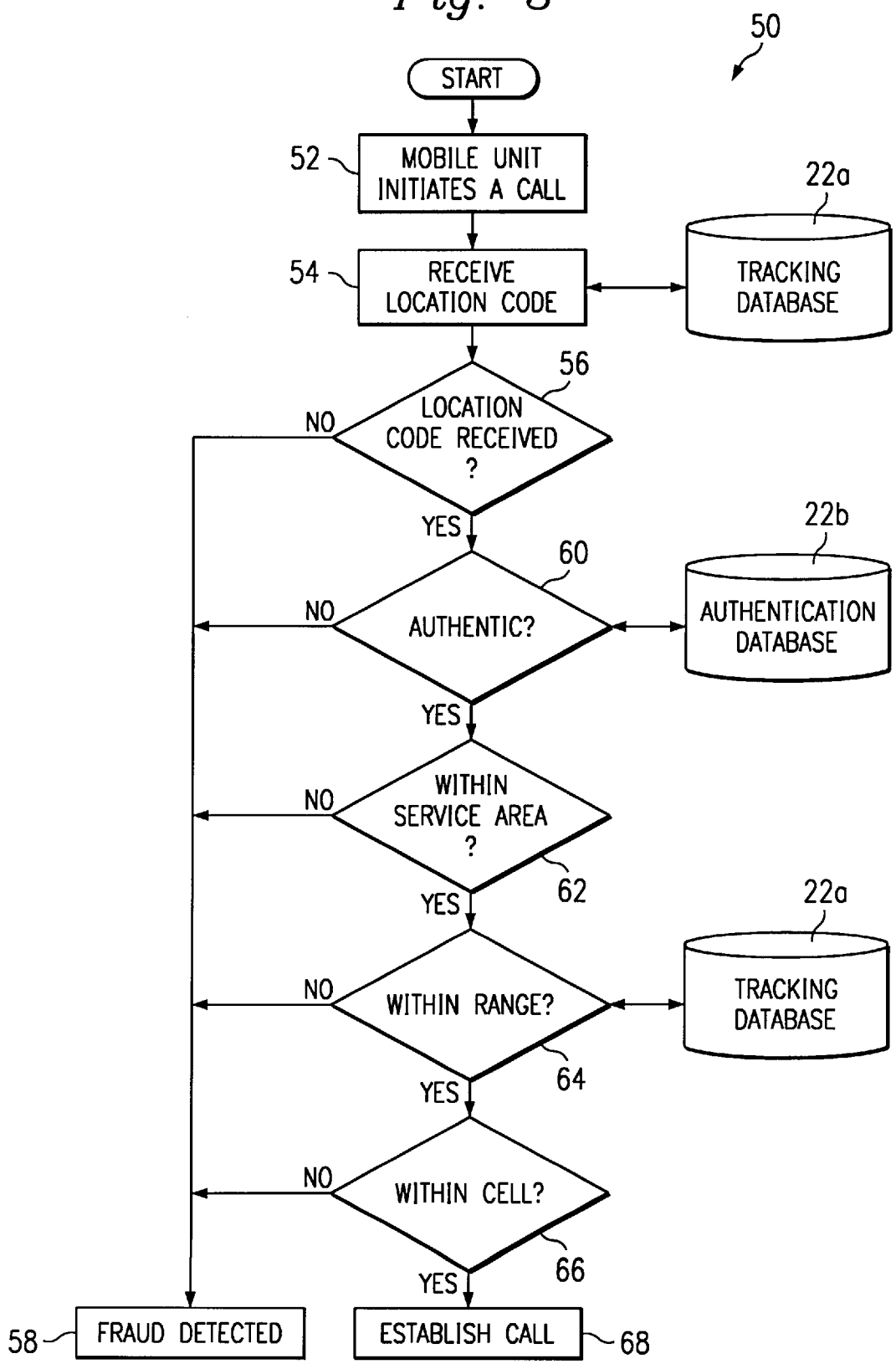

AUTHENTICATION AND TRACKING SYSTEM FOR A CELLULAR TELEPHONE

TECHNICAL FIELD

This invention relates generally to cellular communication networks, and in particular, to the utilization of an advanced positioning system in combination with a cellular communication network for authenticating and tracking a cellular telephone.

BACKGROUND OF THE INVENTION

The cellular communications industry has experienced very rapid growth in both the areas serviced and the number of subscribers. It is not uncommon in many metropolitan areas for mobile switching centers (MSCs) to have service requests numbering in excess of 100,000 call attempts per hour. In these metropolitan areas, each MSC may serve a network of 100 or more cell sites, or base stations, each of which defining a particular cell. Each MSC also keeps track of all mobile units, such as cellular telephones, currently operating in its service area via a database commonly referred to as a visitor location register (VLR). This register stores information regarding the services available to each subscriber, his home MSC and the current status (e.g., active or inactive) of the mobile unit. The MSC, however, does not usually have accurate information regarding the precise geographical location of each of the mobile units within the service area.

When a call is initiated to a mobile unit believed to be within the service area, a page must be broadcast over a forward control channel to all cells in the service area. The mobile unit responds to the page by providing a unique number that identifies the mobile unit. When the mobile unit responds to the page, the particular cell containing the mobile unit is then identified from a reverse control channel used for the mobile response and a cellular link is then set up. When a call is initiated from a mobile unit it simply broadcasts the unique number that identifies the unit. If a cell (as well as the servicing MSC) recognizes the unique number, as well as other certain parameters, a cellular link is established with the mobile unit.

As cellular phone usage has increased, cellular fraud has become more and more prevalent. Cellular fraud occurs when an unauthorized cellular device uses the unique number associated with a legitimate mobile unit. Once the unique number has been discovered, the unauthorized cellular device may utilize the cellular communication network at the expense of the legitimate mobile unit. Furthermore, due to the very nature of mobile units, it is extremely difficult to track down the unauthorized device.

Certain proposals have been discussed for combining a positioning system, such as a system that relies on signals from a global positioning satellite, with a mobile unit. One such proposal is described in a U.S. patent application Ser. No. 08/792,771 entitled "Method and Apparatus for Using Advanced Positioning Systems in Cellular Communication Networks", which is hereby incorporated by reference thereto. Such proposals have not addressed fraudulent use of a mobile unit's unique number, as described above.

Therefore, what is needed is a system that helps to prevent fraudulent use of a cellular communications network.

Furthermore, what is needed is a system that assists in providing location information for a mobile unit operating in the cellular communications network.

SUMMARY OF THE INVENTION

The foregoing problems are solved and a technical advance is achieved by a system and method that uses an advanced positioning system in combination with a cellular communication network to provide various services. In one embodiment, the cellular communication network includes a system capable of receiving a signal indicating an identification number for a mobile unit as well as a location code. In order to determine if the mobile unit is a fraudulent user of the cellular communication network, the system compares the location code with a previously received location code. Since there are natural physical constraints on how quickly a mobile unit can move from one location to another, the system can thereby determine if there are two mobile units using the same identification number. If so, then one is likely a fraudulent user.

In another embodiment, the system compares the location code with a predefined service area. If the mobile unit is operating in a location that has not been pre-approved by the legitimate user, then the mobile unit is likely a fraudulent user. In yet another embodiment, the system compares the cell with which the mobile unit is linked to the location code. If the location code designates an area that is not serviced by the cell, then the mobile unit is likely a fraudulent user.

In another embodiment, the system assists the mobile unit by providing the location code to a third party. This is especially beneficial for emergency dispatcher services since, due to the very nature of mobile units, the user of the mobile unit may not know his precise location.

BRIEF DESCRIPTION OF THE DRAWINGS

FIG. 3 is a flowchart illustrating a tracking and authentication method used in the cellular communication network of FIG. 1.

DESCRIPTION OF THE PREFERRED EMBODIMENT

Figure 1:
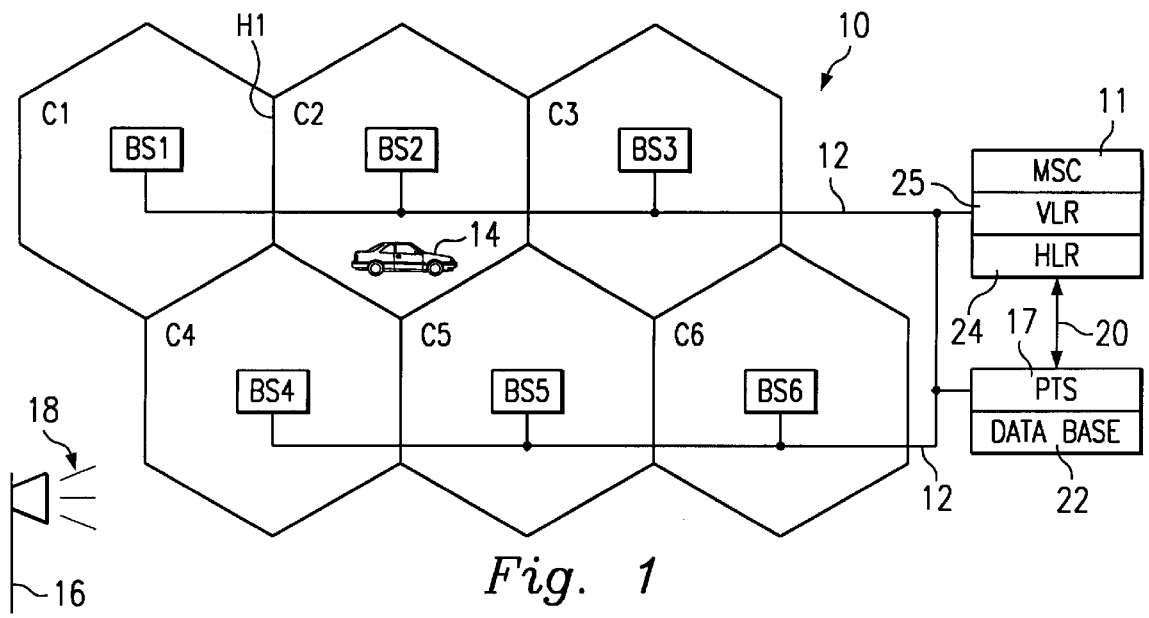
FIG. 1 illustrates an exemplary cellular communication network.

Referring to FIG. 1, the reference numeral 10 designates a simplified cellular communication network operating on a common frequency. The cellular communication network 10 includes many different code division multiple access (CDMA) cells, represented by cells C1, C2, C3, C4, C5 and C6. Each cell C1, C2, C3, C4, C5 and C6 is served by a base station BS1, BS2, BS3, BS4, BS5, and BS6, respectively. All of the base stations BS1, BS2, BS3, BS4, BS5, and BS6 are connected to a mobile switching center ("MSC") 11 via a communication link 12. In the illustrated embodiment, a mobile unit 14 is located inside cell C2. A call by the mobile unit 14 represents communication between the mobile unit and the MSC 11 via a radio frequency (RF) link between the mobile unit and one of the base stations BS1, BS2, BS3, BS4, BS5, and BS6, and the communication link 12. It is understood, however, that the cellular communication network 10 may represent any number of cells connected by one or more different communication links and simultaneously communicating with many mobile units, such as the mobile unit 14. In addition, the cellular communication network 10 may utilize different technologies, such as advanced mobile phone service (AMPS) or time division multiple access (TDMA).

The cellular communication network 10 also utilizes two additional systems. An advanced positioning system 16 is located so that positioning signals 18 are accessible by the mobile unit 14. For example, the advanced positioning system 16 may include one or more global positioning satellites ("GPS") (not shown).

In accordance with features of the present invention, a phone tracking system ("PTS") 17 is also included in the cellular communication network 10. The PTS 17 is a computer capable of interfacing with the MSC 11 and the base stations BS1, BS2, BS3, BS4, BS5, and BS6. For the sake of example, the PTS 17 is shown in FIG. 1 as interfacing the base stations BS1, BS2, BS3, BS4, BS5, and BS6 through the communication link 12 and interfacing with the MSC 11 via a bus 20. The bus 20 uses a conventional messaging scheme such as SS7, X.25, or ISDN. As will subsequently be described in detail, the PTS 17 includes a database 22 for storing certain information for the mobile unit 14. Although not shown, the database 22 may include a tracking database and an authentication database. Furthermore, the PTS 17 may be a separate, individual storage device, may be part of the MSC 11, or may be incorporated with a home location register ("HLR") 24 or a visitor location register ("VLR") 25.

Figure 2:
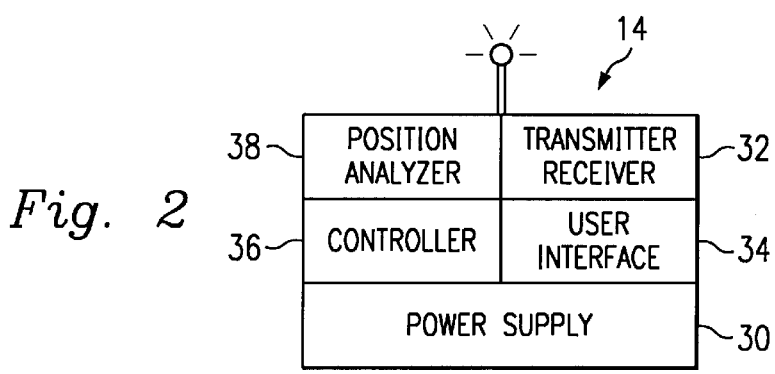
FIG. 2 is a block diagram of a mobile unit for use in the cellular communication network of FIG. 1.

Referring also to FIG. 2, the mobile unit 14 includes a conventional power supply 30, a transmitter/receiver ("T/R") 32 and a user interface 34. The power supply 30 can selectively place the mobile unit 14 in an "off" state, in which no power is used by the mobile unit, an "on" state, in which power is supplied to all components of the mobile unit, and a "standby" state, in which power is only supplied to some components, but in which the mobile unit is capable of receiving and replying to messages from the MSC 11.

The mobile unit 14 also includes a controller 36 and a position analyzer 38. The controller 36 manages many of the conventional functions of the mobile unit 14. In addition, the controller 36 works with the position analyzer 38 and the T/R 32 to receive and analyze the position signal 18 and transmit a location code to the base station serving the cell in which the mobile unit 14 is located, in this case, base station BS2. The location code may be a geographic coordinate (e.g. latitude, longitude, altitude, and time offset) or some other location code that identifies the location of the mobile unit, as discussed in greater detail below.

Referring to FIG. 3, the reference numeral 50 designates a tracking and authentication method used to prevent fraudulent use of a cellular telephone system. For the sake of example, the method 50 will be illustrated with respect to the cellular telephone system 10 of FIG. 1 and the mobile unit 14 of FIG. 2. At step 52, a mobile unit initiates a call by establishing a RF link with the base station BS2. To initiate the call, the mobile unit 14 must include an identification code that identifies a particular transaction account. One way in which fraudulent use of a cellular telephone system occurs is when another user learns of the identification code and uses the identification code to make free or unauthorized calls at the expense of the legitimate user. Upon receipt of the identification code, the MSC 11 references the HLR 24 to determine if the mobile unit is one that has a position analyzer 38. If so, the MSC 11 knows that a location code should be included in the data. At step 54, the mobile unit supplies the location code to the MSC 11. The location code, along with the time of the call, is stored in a tracking database 22a.

At step 56, the MSC 11 checks to make sure that a location code has indeed been received. If no location code has been received, then the mobile unit initiating the call is not the mobile unit 14, a fraudulent user is detected, and execution proceeds to step 58 where the fraudulent user is handled appropriately. The appropriate handling of the fraudulent user is beyond the scope of the present invention. If a location code is received, execution proceeds to step 60, where information from the mobile unit is compared with an authentication database 22b. The authentication database 22b contains lists identifying stolen cellular phones. If a stolen cellular phone is identified, a fraudulent user is detected, and execution proceeds to step 58. Otherwise, execution proceeds to step 62.

At step 62, the PTS 17 compares the location code with a predefined service area stored in the HLR 24. The predefined service area describes locations that the legitimate user of the mobile unit 14 has pre-defined as potential places of operation. For example, at an earlier time, the legitimate user may have explicitly stated that he will not use the mobile unit 14 outside of the United States. If the location code represents a location outside of the United States, a fraudulent user is detected and execution proceeds to step 58. Otherwise, execution proceeds to step 64.

At step 64, the PTS 17 compares the location code with a previously location code from a previous call by the mobile unit 14, the previous location code and the time of the previous call being stored in the tracking database 22a. A simple algorithm is performed that compares the change in distance between the location codes with the amount of time that has elapsed between the present call and the previous call. As a result, it can be readily determined if two different mobile units are in use. If two different mobile units are in use, a fraudulent user is detected, and execution proceeds to step 58. Otherwise, execution proceeds to step 66.

At step 66, the PTS 17 compares the location code with the cell C2 serviced by the base station BS2. The location code should designate a location inside the cell C2. If the location designated by the location code is not inside the cell C2, a fraudulent user is detected, and execution proceeds to step 58. Otherwise, execution proceeds to step 68. At step 68 the call that was initiated in step 52 is established. It is understood that additional steps may also be performed to establish the call with a called party, such additional steps being well understood by those skilled in the art.

Figure 4:
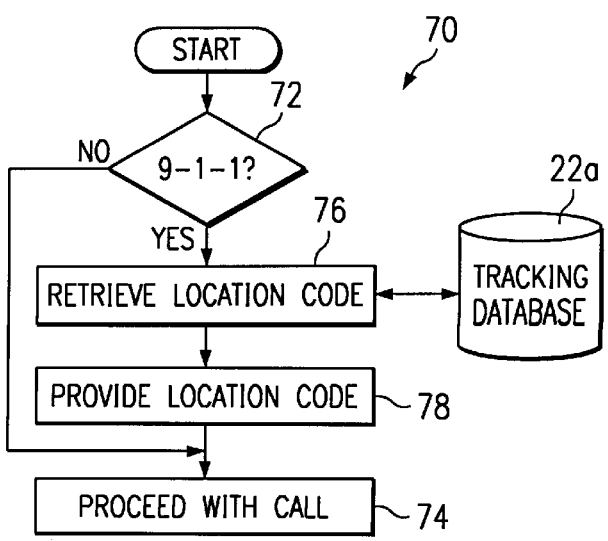
FIG. 4 is a flowchart illustrating a method for providing position information in the cellular communication network of FIG. 1.

Referring to FIG. 4, the reference numeral 70 designates a method for providing position information during a cellular telephone system. In continuance of the above example, the method 70 will be illustrated with respect to the cellular telephone system 10 of FIG. 1 and the mobile unit 14 of FIG. 2. In addition, it will be assumed that the tracking and authentication method 50 of FIG. 3 was used to establish a call between the mobile unit 14 and the called party. At step 72, a determination is made as to whether the call is a position-required call. For example, is the call to 9-1-1? If the call is not a position-required call, execution proceeds to step 74 where the call proceeds normally.

If, at step 72, it is determined that the call is a position-required call, then execution proceeds to step 76 and the location code is retrieved from the tracking database 22a. At step 78 the location code is provided to the called party. For example, if the call was a 9-1-1 call, the location code may be provided using electronic signaling to an emergency dispatcher that has received the call. Alternatively, a voice synthesizer and translator (both not shown) may interpret the location code into position information and then speak the information onto the call. Once the location code has been provided to the called party, execution proceeds to step 74 where the call proceeds normally.

Although illustrative embodiments of the invention have been shown and described, other modifications, changes, and substitutions are intended in the foregoing disclosure. For example, they can be used to track and find lost or stolen mobile units. Accordingly, it is appropriate that the appended claims be construed broadly and in a manner consistent with the scope of the invention.

What is claimed is:

1. A system for determining whether a mobile unit is a fraudulent user of a cellular communication network, the system comprising:

a signaling device for receiving at a mobile switching center a signal comprising a mobile unit identification identifying the mobile unit;

a means for determining from the identification whether the mobile unit includes a location positioning device;

a means for determining whether a next signal at a mobile switching center indicates a present location of the mobile unit within the cellular communication network by use of a global positioning satellite; and a processing device for comparing the present location and the present time with a previous location and a previous time of a mobile unit identified by the mobile unit identification to determine whether two different mobile units are using the same mobile unit identification by determining whether it would be physically possible for the mobile unit identified by the mobile unit identification to have traveled from the previous location at the previous time to the present location at the present time.

2. The system of claim 1, wherein the processing device is also for comparing the present location with a service area that has been pre-approved by an authorized user of the mobile unit to determine if the mobile unit is in the pre-approved service area; wherein, if the mobile unit is not in the pre-approved service area, the call is blocked.

3. The system of claim 2, wherein the mobile unit is linked to a base station of the cellular communication network and wherein the processing device is also for determining if the indicated present location is in a cell that is serviced by the base station.

4. A method for determining whether a mobile unit is a fraudulent user of a cellular communication network, the method comprising the steps of:

receiving at a mobile switching center a signal comprising a mobile unit identification identifying the mobile unit;

determining from the identification whether the mobile unit includes a location positioning device and if so;

determining whether a next signal at a mobile switching center indicates a present location of the mobile unit within the cellular communication network by use of a global positioning satellite and if so;

comparing the present location and the present time with a previous location and a previous time of a mobile unit identified by the mobile unit identification; and determining based on the comparing whether two different mobile units are using the same mobile unit identification by determining whether it would be physically possible for the mobile unit identified by the mobile unit identification to have traveled from the previous location at the previous time to the present location at the present time;

if the present location of the mobile unit is not received at the mobile switching center, blocking all calls except emergency calls from the mobile unit.

5. The method of claim 4 further including:

comparing the present location with a service area pre-approved by an authorized user of the mobile unit;

determining based on the comparing whether the mobile unit is in the pre-approved service area; and blocking all calls from the mobile unit if the mobile unit is not in the pre-approved service area.

6. The method of claim 5, wherein the mobile unit is linked to a base station of the cellular communication network, the method further comprising the step of:

determining if the present location is in an area that is serviced by the base station.

7. The method of claim 4 further including comparing the identification of the mobile unit to a list of stolen mobile units and blocking all calls except emergency calls from the mobile unit if the identification of the mobile unit matches an identification in the list of stolen units.

* * * * *